(12) United States Patent
Darmann

(10) Patent No.: US 6,914,511 B2
(45) Date of Patent: Jul. 5, 2005

(54) SUPERCONDUCTING TRANSFORMER

(75) Inventor: Francis Anthony Darmann, New South Wales (AU)

(73) Assignee: Metal Manufactures Limited, Gordon (AU)

( * ) Notice: Subject to any disclaimer, the term of this patent is extended or adjusted under 35 U.S.C. 154(b) by 132 days.

(21) Appl. No.: 10/239,232

(22) PCT Filed: Mar. 21, 2001

(86) PCT No.: PCT/AU01/00315

§ 371 (c)(1),
(2), (4) Date: Jan. 2, 2003

(87) PCT Pub. No.: WO01/71733

PCT Pub. Date: Sep. 27, 2001

(65) Prior Publication Data

US 2004/0061584 A1 Apr. 1, 2004

(30) Foreign Application Priority Data

Mar. 21, 2000 (AU) .............................................. PQ6376

(51) Int. Cl.[7] ............................ H01F 27/24; H01F 7/06
(52) U.S. Cl. ..................................... 336/212; 29/602.1
(58) Field of Search ........................... 336/DIG. 1, 212, 336/602.1

(56) References Cited

U.S. PATENT DOCUMENTS 5,568,114 A * 10/1996 Fogelberg et al. .......... 336/206
5,689,223 A    11/1997 Demarmels et al.

FOREIGN PATENT DOCUMENTS

| AU | 199947583 A1 | 9/1999 | |
|---|---|---|---|
| GB | 2331852 A * | 6/1999 | ........... H01F/27/28 |
| JP | 64-23518 | 1/1989 | |
| WO | WO 97/24736 | 7/1997 | |
| WO | WO 97/26668 | 7/1997 | |
| WO | WO 00/16350 | 3/2000 | |

* cited by examiner

*Primary Examiner*—Anh Mai
(74) *Attorney, Agent, or Firm*—Fay Kaplun & Marcin, LLP

(57) ABSTRACT

A superconducting transformer includes two pairs of axially extending windings (1, 2, 3 and 4). The windings are each in the from of a right cylindrical solenoid having a circular cross-section which are substantially concentrically nested. Each winding (1, 2, 3 and 4) includes a plurality of turns formed from superconducting tape. Each winding respectively includes a first end and a second end (5 and 6, 7 and 8, 9 and 10, and 11 and 12) which are configured for electrical connection with at least one of the other ends, and alternating power source (13), a load (14), or other passive or active electrical components. The ampere turns of a first pair of the windings (1 and 3), is substantially the same as the ampere turns of a second pair of the windings (2 and 4).

54 Claims, 9 Drawing Sheets

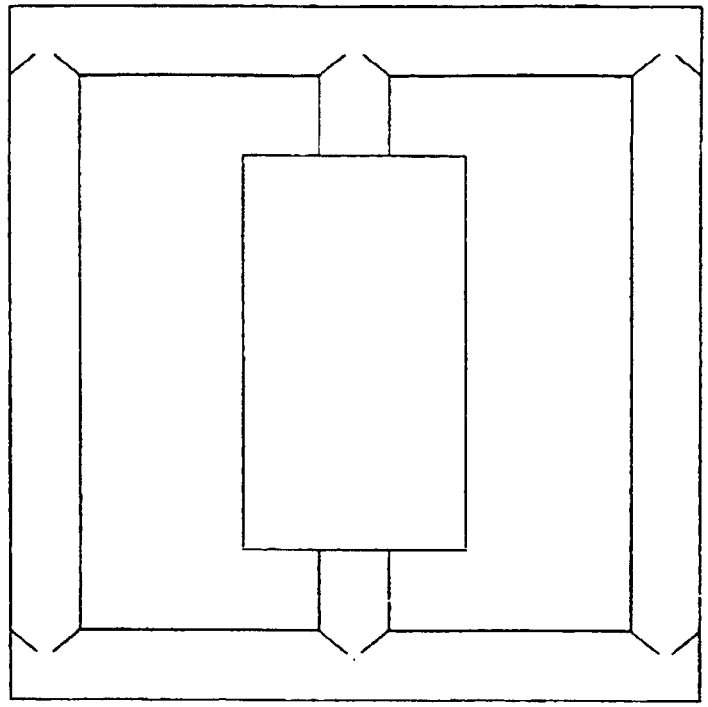

"2500 m 2:1 core 1.75 T"

Rating 100 kVA, 6.6 kV/240 V Star:Star
5.1 A Primary AC current
140 A Secondary AC current

| Core Type | | |
|---|---|---|
| Acore = 0.0052 m² | Limb Length = 0.496 m | Primary coil loss = 25 Watts (calculated) (5 W if twisted) |
| Dcore = 0.081 m | Yoke Length = 0.5909 m | Estimated Secondary coil loss = 25 Watts (5 W if twisted) |
| IDS = 0.1413 m | Imag ~ 0.1 Amps | Core loss = 150 W (1.5 W/kg) . |
| ODs = 0.1518 m | Np = 3628 Turns | 3 phase coil losses = 150 Watts (30 W twisted) |
| IDp = 0.1718 | Ns = 132 Turns | Including cryogenic cost = ca 1500 watts (300 W if twisted) |
| ODp = 0.1891 | Ip = 5.1 A rms | Total losses = 1650 Watts (450 W if twisted) (1000 W |
| Hp = Hs = 0.406 m | Is = 140 A rms | conventionally) |
| 3f Vol = 102 litres | Ps = 10 (Secondary Pancakes) | 3Ph efficiency = 98.35 % (99.55 % if twisted) |
| | Pp = 147 (Primary Pancakes) | |

FIG.6

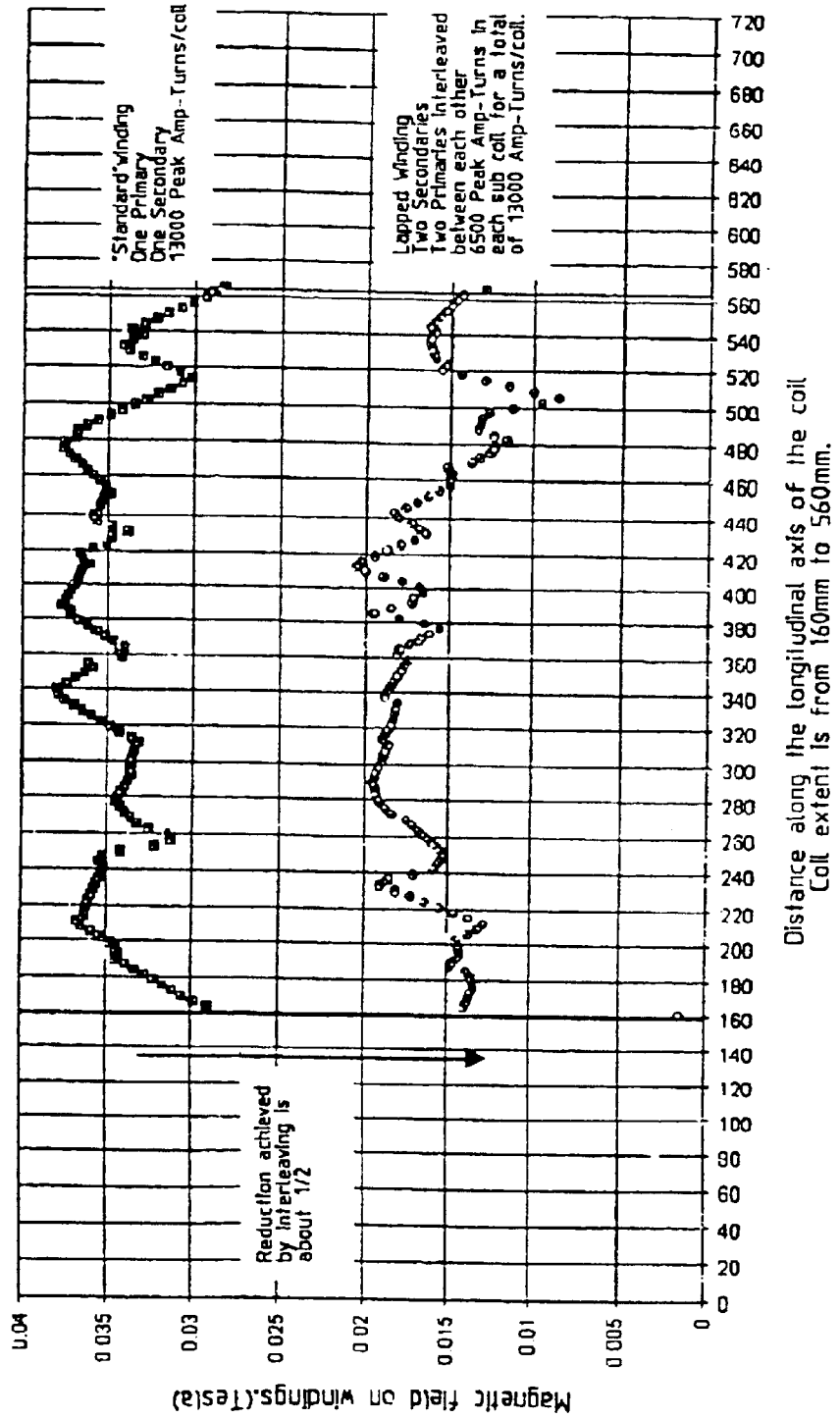

SUPERCONDUCTING TRANSFORMER

CROSS REFERENCE TO RELATED APPLICATIONS

This application corresponds to International Patent Application No. PCT/AU01/00315, filed Mar. 21, 2001, and claims priority under 35 U.S.C. §119 from Australian Patent Application No. PQ6376, filed Mar. 21, 2000.

FIELD OF THE INVENTION

The present invention relates to a transformer and in particular to a superconducting transformer.

The invention has been developed primarily as a power transformer and will be described hereinafter with reference to that application. However, the invention is not limited to those particular fields of use and is also applicable to any transformer requiring a low impedance or a low external flux leakage, as well as to transformers used in high-frequency applications.

DISCUSSION OF THE PRIOR ART

All superconductors that are subject to an alternating current and/or immersed in an applied magnetic field will experience energy loss in the form of heat dissipation. This energy loss results substantially from hysteresis loss, coupling current loss and eddy current loss.

Hysteresis losses develop due to the non-reversible magnetisation of the superconductor in a time varying magnetic field. In a magnetic field which is in its sinusoidal steady state (SSS) and characterised by a frequency, f, the specific hysteresis losses are fixed with respect to frequency. In respect of the magnetic field, the hysteresis loss, measured in joules per cubic metre of material per sinusoidal cycle, depends in a complex way on the arrangement of the conductors and the magnitude and direction of the magnetic field. Generally, this component of loss will increase with the first, second, third or fourth powers of the amplitude of the magnetic field depending on the situation. In general, it has been found that hysteresis loss is proportional to the first or second power of the magnetic field. No other higher or lower order dependencies are known.

Coupling currents are the result of a time varying magnetic field acting in an electrical conductor or superconductor. It is well known that coupling currents are defined as those currents which specifically form loops of current such that part of the loop includes a superconducting medium and part a normally conductive medium. Coupling losses arise when the conductive medium has a finite conductivity and loops of coupling current cross through this medium with a resistive power loss. When in the SSS, the coupling current loss is proportional to the square of the magnetic field amplitude. The coupling current losses, when expressed in units of joules/cubic metre, are also proportional to the second power of the frequency.

The final substantial source of losses result from eddy currents. Eddy currents result from loops of normal current which flow entirely in the normal conducting material and thereby exhibit conventional resistive losses. Specific eddy current losses in the SSS, expressed in joules per cubic metre, are proportional to the square of the magnetic field as well as to the second power of the frequency. The eddy current losses are small compared to the hysteresis losses in certain situations. For example, where the electrical windings of the superconductors are such that the windings are insulated from each other and consist of small dimension conductors where the largest cross section dimension is not greater than the skin depth at the frequency of operation. At high frequencies, greater than 0.4 kHz in some situations, and high magnetic field amplitudes, the eddy current losses begin to dominate the total loss.

As is well known, when two windings or conductors are placed side by side in close proximity and one is powered with a current, the second winding will experience effects from the magnetic field created from the current travelling in the first conductor. For an AC current powering the first winding, the second winding will then develop an EMF according to Faraday's law. In the case of a transformer, the ends of the second winding are closed to form a complete circuit and current flows in that winding. This winding is then generally referred to as the secondary winding. The currents are said to be compensated and will obey the relation $I_1 N_1 = I_2 N_2$, where I is the current in each winding and N is the number of turns in each winding. Additionally, a magnetisation current will flow in the primary coil, or the coil to which an external EMF is applied. When the secondary winding is open circuited, the current in the primary coil will be a purely magnetising current. In the SSS, the magnetisation current will be lagging the applied EMF by $\pi/2$ radians.

The current induced in the second winding also produces a magnetic field, but this field will oppose the field produced by the first winding in accordance with Lenz' law.

To minimise the magnetisation current, which produces no useful output at the secondary terminals, the common centre volume of the transformers can be occupied by a high permeability material, such as iron. In the SSS, this reduces the magnetising current to a small fraction of the primary rated current, typically by less than 5% to 10%. Preferably, the iron is present in a closed loop which presents a path of least reactance for the closed lines of magnetic field to flow. This path is commonly referred to as a low reactance path.

The component of the net magnetic field which does not follow the low reactance path is denoted the leakage field, and the flux which represents this is referred to as the leakage flux, $\Phi_L$. A leakage reactance can be calculated by dividing the leakage flux by the RMS value of the primary current. In the SSS, the electrical impedance of the transformer represented in the equivalent circuit rendition may be calculated by multiplying the leakage reactance by a factor of $2\pi f$. The net leakage flux may be reduced by minimising the distance the primary and secondary windings are spaced from each other, as well as minimising the maximum separation between any two windings while allowing sufficient electrical insulation between them.

The alternating magnetic fields which remain after the non-ideal cancellation of the magnetic contributions of the primary and secondary windings result in winding AC losses. That is, these losses are directly caused by magnetic fields which impinge on the conductors. Practical transformers are given a rating, S, in units of VA, which is derived from the so-called transformer equation. The transformer equation used is:

$$S = \pi \sqrt{2} f (NI) B_{peak} A,$$

where: $B_{peak}$ is the peak magnetic field in the AC cycle present in the common volume of the windings which is filled with the high permeability material. A is the cross-sectional area of the high permeability material; NI denotes the number of ampere turns; and f is the frequency. $B_{peak}$ is chosen to be as large as possible without significantly magnetically saturating the material common to both windings. Although reducing the peak would reduce the stray magnetic field impinging on the conductors, this would also make the required common area to be larger than necessary and would result in a transformer design of massive proportions. The most practical way to reduce the stray magnetic field impinging on the conductors is to place each turn of the separate windings as spatially close together as possible whilst keeping their annular thickness as small as possible. For example, this is achieved in a conventional transformer by having the primary and the secondary windings concentrically disposed in abutment with each other.

Prior known superconducting transformers have addressed the loss problems discussed above, which are termed AC losses, by employing superconductors which are configured to reduce the hysteresis, coupling, and eddy current losses. Examples of this include twisting superconducting filament wires and tapes and superconducting wires and tapes having high resistance barriers placed around the filaments to substantially block the coupling current loops within. However, the AC losses are still present regardless of the type of tape or wire employed. Moreover, the AC losses always increase in the presence of an increasing external impinging magnetic field.

The above discussion of the prior art is intended to provide the addressee with some context and is not to be taken as an admission of the state of common general knowledge in the art.

BROAD DISCLOSURE OF THE INVENTION

It is an object of the present invention to overcome or ameliorate at least one of the disadvantages of the prior art, or to provide a useful alternative.

According to a first aspect of the invention there is provided a superconducting transformer including at least two pairs of concentrically nested and axially extending windings, each winding having a plurality of turns formed from superconducting tape wherein one winding in each pair is configured for electrical connection to an alternating power source and the other winding in each pair is configured for connection to a load, such that the ampere-turns of a given pair of windings is substantially the same as the number of ampere-turns of any other pair.

Preferably, one of the pairs is concentrically nested within the other pair. In other embodiments, however, the pairs are concentric and axially offset.

Preferably also, the windings are tubular. More preferably, the windings are substantially cylindrical. In other embodiments, however, the windings are formed by winding about a square former and, as such, the windings include four straight sections joined by four intermediate curved sections.

Preferably, where the pairs are nested within each other, the alternate windings are connected in series and respectively configured for electrical connection across the power source and the load. Alternatively, the alternate windings are each respectively electrically connected in parallel and configured for electrical connection to the power source and load.

In a preferred form, the alternate windings are connected such that the magnetic field caused by each winding in the common volume is substantially in the same direction.

Preferably, the transformer includes two pairs of axially extending windings in which the first pair includes a first axially extending primary winding corresponding to the outermost winding and a first axially extending secondary winding nested within the first primary winding and the second pair includes a second axially extending primary winding nested within the first secondary winding and a second axially extending secondary winding nested within the second primary winding and corresponding to the innermost winding, the transformer including three predetermined gaps defining the radial separation of the nested windings and a predetermined core gap defining the diameter of the second secondary winding, wherein the first primary winding and first secondary winding include substantially the same number of ampere-turns as the second primary winding and the second secondary winding.

More preferably, the transformer includes:

a third pair of axially extending windings substantially concentrically nested within the second secondary winding in which the third pair of windings includes a third axially extending primary winding and a third axially extending secondary winding concentrically nested within the third primary winding; and a fourth and fifth predetermined gap respectively defining the radial separation of the second secondary winding and the third primary winding and the radial separation of the third primary winding and third secondary winding and the predetermined core gap defines the inner diameter of the third secondary winding, wherein the third primary winding and third secondary winding include substantially the same number of ampere-turns as the first primary winding and the first secondary winding and the second primary winding and the second secondary winding.

Preferably, the five predetermined air gaps and the core gap are filled with air.

Preferably also, the volume of the five predetermined gaps are occupied by air and a material, for concentrating the magnetic field, occupies the volume of the predetermined core gap.

Preferably also, all of the predetermined gaps and the predetermined core gap are filled with the material.

More preferably, the material forms a pair of opposed and coplanar closed loops which share a common portion for occupying a substantial volume of the predetermined core gap.

In a preferred form, the material has a high relative magnetic permeability with a low magnetic remnance and high saturation point. More preferably, the permeability is greater than 1000 and the material is magnetically soft.

Preferably also, the volume corresponding to the predetermined core gap is used as a conduit to transport cryogen.

According to a second aspect of the invention there is provided a superconducting transformer including:

a first primary winding for electrically connecting with an alternating power source, the first winding extending along a first axis and having a first plurality of turns of superconducting tape;

a second primary winding for electrically connecting with the source, the second winding extending along a second axis and having a second plurality of turns of superconducting tape;

a first secondary winding extending along the first axis for electrically connecting with a load, the first secondary winding being magnetically coupled to the first primary winding and having a third plurality of turns of superconducting tape; and a second secondary winding extending along the second axis for electrically connecting with the load, the second secondary winding being magnetically coupled to the second primary winding and having a fourth plurality of turns of superconducting tape.

Preferably, the ratio of the first plurality of turns to the third plurality of turns is equal to the ratio of the second plurality of turns to the fourth plurality of turns. More preferably, the first plurality of turns is equal to the second plurality of turns and, therefore, the third plurality of turns is equal to the fourth plurality of turns.

Preferably also, the first and the second axes are coaxial. More preferably, the first and the second axes are linear. In other embodiments, however, one or both of these axes are curvilinear.

In a preferred form, one of the primary windings is concentrically nested within the other primary winding and one of the secondary windings is concentrically nested within the other secondary winding. In other embodiments, one of the primary windings is concentrically nested within one of the secondary windings and the other primary winding is concentrically nested within the other secondary winding.

Preferably, the primary windings are electrically connected together in series to the source and the secondary windings are electrically connected together in series to the load. In other embodiments the primary windings are electrically connected together in parallel to the source and the secondary winding are electrical connected together in parallel to the load.

Preferably also, both the secondary windings are magnetically coupled to both the primary windings.

In a preferred form, the primary windings are substantially axially coextensive and radially nested. More preferably, the secondary windings are substantially axially coextensive and radially nested. Even more preferably, the primary windings and the secondary winding are all substantially axially coextensive and radially nested wherein the primary windings and the secondary windings are radially alternated.

Preferably, radially adjacent windings define between them respective winding gaps and the or each radially innermost winding defines a corresponding core gap. More preferably, the winding gaps are substantially air. Even more preferably, however, the winding gaps are substantially occupied with a high magnetically permeable material. Additionally, it is preferred that the core gap or gaps are substantially occupied with a high magnetically permeable material.

More preferably, the transformer includes:

a third primary winding for electrically connecting to the source and having a fifth plurality of turns of superconducting tape, the third winding being concentrically nested within the second primary winding; and a third secondary winding for electrically connecting to the load and having a sixth plurality of turns of superconducting tape, the third secondary winding being concentrically nested within the second secondary winding wherein the ratio of the fifth plurality of turns to the sixth plurality of turns is equal to the ratio of the first plurality of turns to the second plurality of turns.

That is, it is preferred that the ampere-turns of the third primary winding and the third secondary winding are substantially the same as that for both the first primary winding and first secondary winding and the second primary winding and second secondary winding.

In a preferred form, the material forms a pair of parallel and opposed closed loops which share a common portion for occupying substantially all of the core gaps. Preferably also, the material has a low magnetic remnance and high saturation point. Even more preferably, the material has a permeability greater than 1000 and is a magnetically soft ferrite.

Preferably, a cryogen is received in the or all the core gaps between the material and the innermost winding.

Preferably also, a pair of opposed and coplanar closed loops having a common elongate portion for disposal in the centre portion of the chamber.

Preferably, the superconducting tape is twisted about its longitudinal axis to provide an anisotropic response to externally applied or self-generated magnetic fields.

Preferably, the superconducting tape operates in the temperature range between 1K and 110K. More preferably, the superconductor tape operates in the temperature range between 63K and 77K.

Preferably, the current carrying conductor is manufactured from a number, N, of insulated superconductors, each of length L, which are bundled so as to form one larger conductor also of length L. The individual current carrying superconductors within each larger conductor are transposed in the usual conventional manner about each other a minimum of L/N times throughout the winding. More preferably, the individual current carrying superconductors are transposed in the usual conventional manner about each other a total of N−1 times per layer of winding. Even more preferably, the individual current carrying superconductors are continuously transposed with a pitch of not more than 3 times of half greatest dimension of the individual superconductors.

Preferably, the superconducting tape is of the powder-in-tube type and includes a plurality of longitudinally extending filaments of superconducting material embedded in a metal or metal alloy based matrix. Preferably also, the metal is silver and the metal alloy is silver alloy. More preferably, the thickness of each filament is less than 40 micrometers and the overall tape thickness is 0.10 mm to 1.20 mm. More preferably, the overall tape thickness is 0.20 mm to 1.20 mm and the tape width is 1.8 mm to 20 mm.

Preferably, the superconducting material is BSCCO-2223.

Preferably, the first primary and secondary windings are interleaved with each other. More preferably, the second primary and secondary windings are interleaved with each other. In some embodiments, the first and second primary windings are interleaved and the first and second secondary windings are interleaved.

According to a third aspect of the invention there is provided a method for producing a superconducting transformer according to the first aspect of the invention and selected ones of its preferments defined above, the method including the steps of:

forming at least two pairs of axially extending windings having a plurality of turns formed from a superconducting tape;

concentrically nesting the windings within each other;

electrically connecting alternate windings in series;

electrically connecting alternate windings, starting from the outermost winding, to an alternating current source, and electrically connecting the other alternate windings to a load; and configuring the ampere-turns of sequential pairs of windings to be substantially the same as the ampere-turns of any other sequential pair of windings.

Preferably, the method includes the step of connecting the alternate windings magnetically in series.

According to a fourth aspect of the invention there is provided a method of producing a superconducting transformer according to the first aspect of the invention and selected ones of its preferments defined above, the method including the steps of:

forming at least two pairs of axially extending windings each having a plurality of turns formed from a superconducting tape;

concentrically nesting the windings within each other;

electrically connecting alternate windings, starting from the outermost winding, in parallel across an alternating current source, and electrically connecting the other alternate windings in parallel across a load; and configuring the ampere-turns of sequential pairs of windings to be substantially the same as the ampere-turns of any other sequential pair of windings.

According to another aspect of the invention there is provided a method of constructing a superconducting transformer including the steps of:

providing at least two pairs of concentrically nested and axially extending windings, each winding having a plurality of turns formed from superconducting tape;

configuring one winding in each pair for electrical connection to an alternating power source; and configuring the other winding in each pair for connection to a load such that the ampere-turns of a given pair of windings is substantially the same as the number of ampere-turns of any other pair.

The preferred embodiments of the invention have arisen from the appreciation by the inventors that the most direct way of reducing the AC losses for all superconducting tapes and wires is to reduce the magnetic field impinging on the conductors. This, in turn, has resulted in the embodiments being configured to minimise the distance between the inner turns of the secondary winding and the outer turns of the primary winding.

BRIEF DESCRIPTION OF THE DRAWINGS

Preferred embodiments of the invention will now be described, by way of example only, with reference to the accompanying drawings in which:

FIG. 6 is a schematic perspective view of an alternative embodiment of the transformer of FIG. 1, 2 or 3;

FIG. 7 is a plot of the magnetic field impinging on the superconducting windings of the transformer of FIG. 1 as a function of the axial position of the windings.

DETAILED DESCRIPTION OF THE PREFERRED EMBODIMENTS

Figure 1:
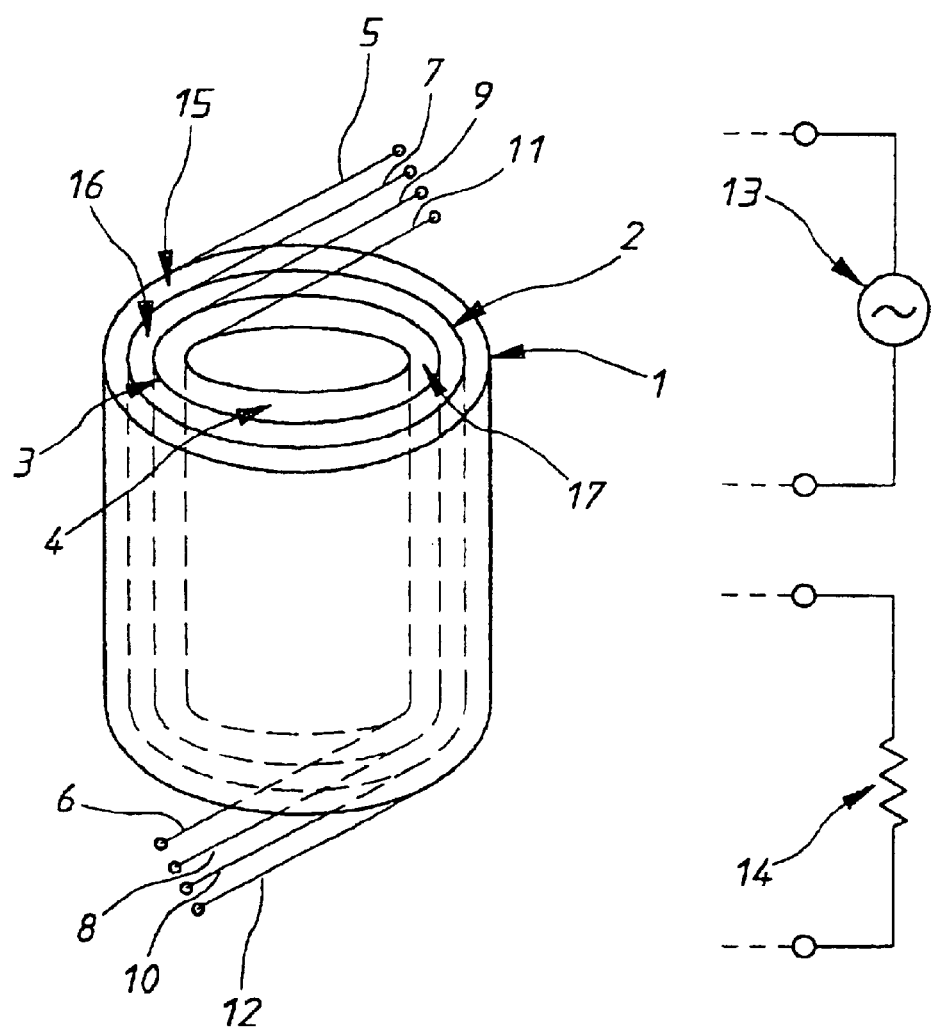
FIG. 1 is a schematic perspective view of a transformer according to the invention.

Referring to FIG. 1, there is provided a superconducting transformer including two pairs of axially extending windings 1, 2, 3 and 4. The windings are each in the form of a right cylindrical solenoid having a circular cross-section which are substantially concentrically nested.

In other embodiments, the windings are cylindrical with a square cross-section. In yet other embodiments, the windings are cylindrical with a polygonal cross-section.

Each winding includes a plurality of turns formed from superconducting tape. Each winding respectively includes a first end and a second end 5 and 6, 7 and 8, 9 and 10, and 11 and 12 which are configured for electrical connection with at least one of the other ends, an alternating power source 13, a load 14, or other passive or active electrical components.

The transformer includes a first axially extending primary winding 1 corresponding to the outermost winding and a first axially extending secondary winding 2 nested within the first primary winding. A second axially extending primary winding 3 is nested within the first secondary winding 2. A second axially extending secondary winding 4 is nested within the second primary winding 3 such that the second secondary winding 4 corresponds to the innermost winding.

Alternate windings are respectively configured for electrical connection to the alternating power source and the load. That is, ends 5 and 6, and 9 and 10 are configured for electrical connection to source 13. Ends 7 and 8, and 11 and 12 are respectively configured for electrical connection to load 14. The ampere turns of windings 1 and 3, and 2 and 4 are substantially the same.

Alternate windings 1 and 3 are electrically connected by superconducting tape in series at ends 6 and 10, and ends 5 and 9 are respectively connected across source 13. Similarly, alternate windings 2 and 4 are electrically connected by superconducting tape in series at ends 8 and 12, and ends 7 and 11 are electrically connected across load 14.

The transformer further includes three predetermined gaps 15, 16 and 17 which define the radial separation of the nested windings. A predetermined core gap 18 defines the diameter of the second secondary, or innermost, winding 4.

Figure 2:
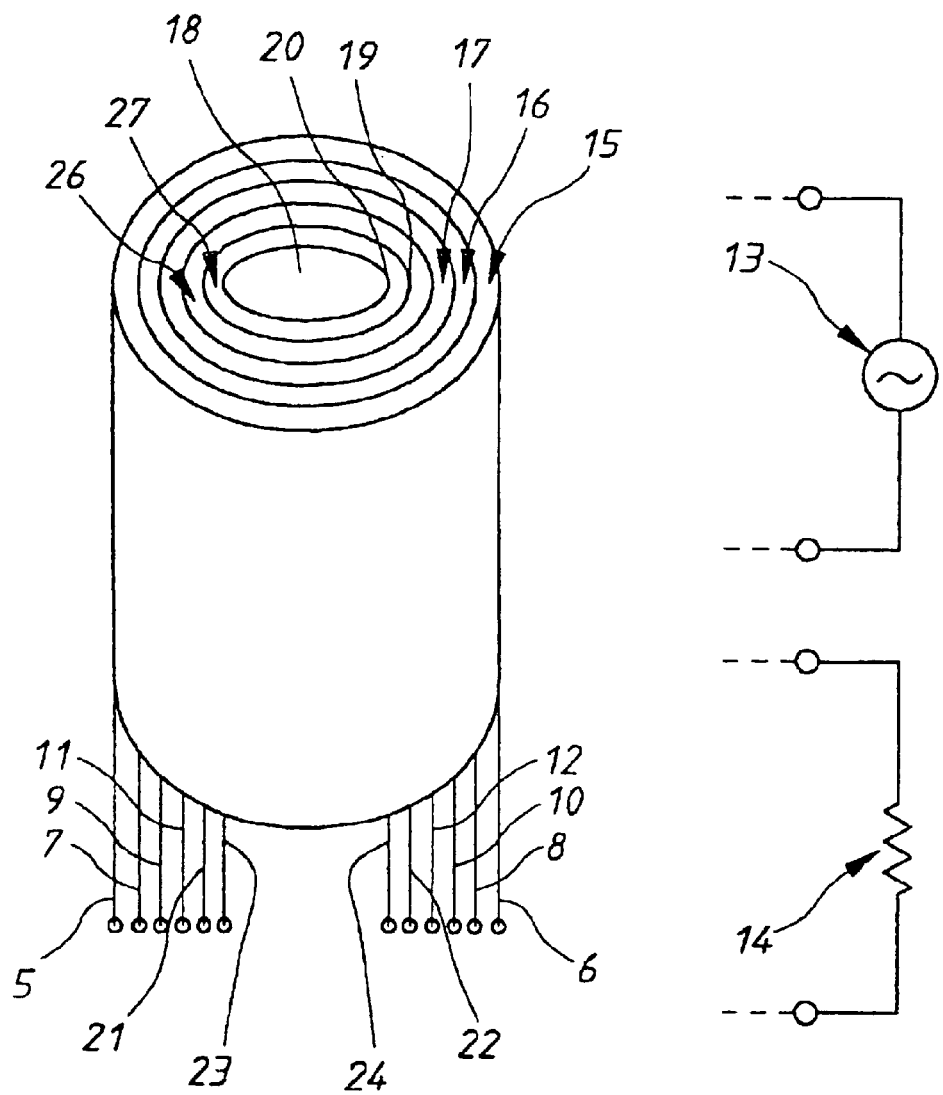
FIG. 2 is a schematic perspective view of another embodiment of the transformer of FIG. 1.

Referring to FIG. 2, where corresponding features are denoted by corresponding reference numerals, there is illustrated a transformer including three pairs of axially extending windings. A third axially extending primary winding 19 is nested within winding 4 and includes two ends 21 and 22 respectively configured for electrical connection with at least one of the other ends, source 13, load 14, or other passive or active electrical components. A third secondary winding 20 is nested within winding 19 and includes two ends 23 and 24 which are respectively configured for electrical connection with at least one of the other ends, source 13, load 14, or other passive or active electrical components.

A fourth and fifth predetermined gap 26 and 27 respectively define the radial separation of the nested windings. That is, gap 26 defines the space between winding 4 and 19, and gap 27 defines the radial separation between winding 19 and 20. In this embodiment, the core gap 18 corresponds to the inner diameter of winding 20.

Winding 19 and 20 each include substantially the same number of ampere turns as winding 1 and 2, and winding 3 and 4.

The alternate windings, being electrically connected by superconducting tape in series, are configured such that ends 9 and 21, and ends 6 and 10 are electrically connected, and ends 5 and 22 are electrically connected across source 13.

The other alternate windings, also being electrically connected by superconducting tape in series, are configured such that ends 11 and 23, and ends 8 and 12 are electrically connected, and ends 7 and 24 are electrically connected across load 14.

The five gaps 15, 16, 17, 26 and 27 and core gap 18 are filled with air. In other embodiments, gap 18 is occupied substantially by a material for concentrating the magnetic field. In yet other embodiments, the material occupies substantially all of the gaps. Alternatively, the gaps are occupied by liquid nitrogen, liquid helium, liquid neon, or other suitable cryogen.

As shown in FIG. 6, the transformer includes a pair of opposed and coplanar closed loops 80 and 81 formed from the material and sharing a common portion 82. As shown, portion 82 occupies a substantial volume of gap 18. The material in this embodiment is iron although, in other embodiments the material is a ferrite substance.

Other alternative embodiments employ gap 18 as a conduit to transport cryogen, in the form of liquid nitrogen, for cooling the windings. This occurs both instead of or in addition to the disposition of the material in gap 18.

Figure 3:
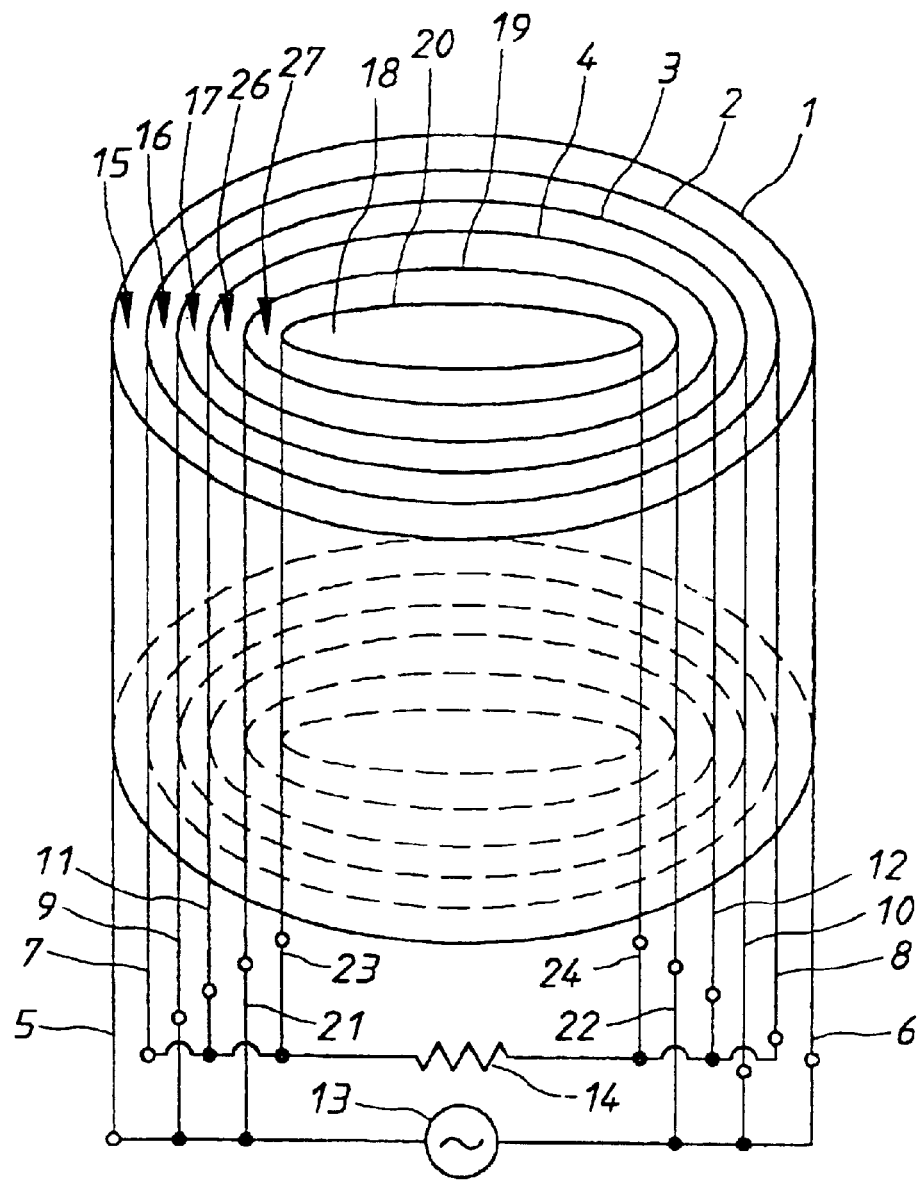
FIG. 3 is a schematic perspective view of another embodiment of the transformer of FIG. 1.

Referring to FIG. 3, there is illustrated a transformer including three pairs of substantially concentrically nested windings 1, 2, 3, 4, 19 and 20. Primary windings 1, 3 and 19 are respectively electrically connected together in parallel to source 13 by means of electrical connection at ends 5 and 6, 9 and 10, and 21 and 22.

Similarly, ends 7 and 8, 11 and 12, and 23 and 24 of windings 2, 4 and 20 are each respectively connected across load 14.

Figure 4:
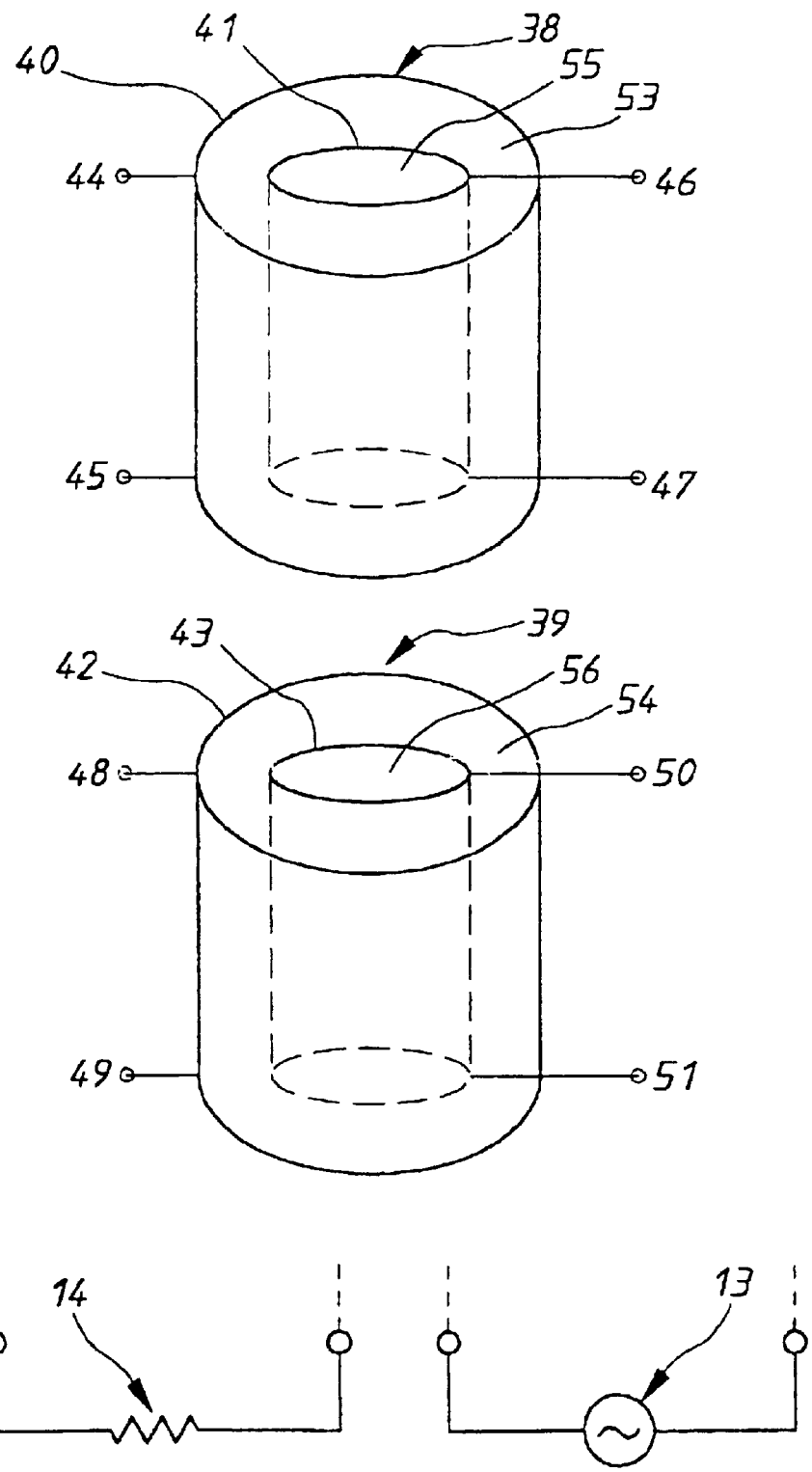
FIG. 4 is a schematic perspective view of an alternative embodiment of a superconducting transformer according to the invention.

Referring to FIG. 4 there is illustrated another aspect of the superconducting transformer including an axially extending primary winding 38 having a plurality of axially extending windings 40 and 41. The windings are substantially concentrically nested circular cross-sectioned solenoids. Each winding 40 and 41 includes a plurality of turns of superconducting tape having ends 44 and 45, and 46 and 47 which are respectively configured for electrical connection to source 13.

The transformer further includes an axially extending secondary winding 39 disposed coaxially with and longitudinally spaced apart from winding 38. Winding 39 includes a plurality of axially extending windings 42 and 43. These windings are substantially concentrically nested circular cross-sectioned solenoids. Each winding 42 and 43 includes a plurality of turns of superconducting tape having ends 48 and 49, and 50 and 51 which are respectively configured for electrical connection to load 14.

Windings 40 and 41 in winding 38 are electrically connected in series by having ends 45 and 47 electrically connected with superconducting tape. The other ends 44 and 46 of windings 40 and 41 are electrically connected across source 13.

Similarly, windings 42 and 43 of winding 39 are electrically connected by in series by having ends 49 and 51 electrically connected by superconducting tape. Other ends 48 and 50 of windings 42 and 43 are electrically connected across load 14.

In other embodiments, not shown, ends 44 and 45 of winding 40 and ends 46 and 47 of winding 41 are each electrically connected in parallel across source 13. Similarly, ends 48 and 49 of winding 42 and ends 50 and 51 of winding 43 are each electrically connected in parallel across load 14.

The transformer includes a first gap 53 and a second gap 54 which respectively correspond to the radial separation of the windings 40 and 41 and windings 42 and 43. Winding 38 includes a first predetermined core gap 55 which corresponds to the inner diameter of winding 41. Similarly, winding 39 includes a second predetermined core gap 56 corresponding to the inner diameter of winding 43.

Figure 5:
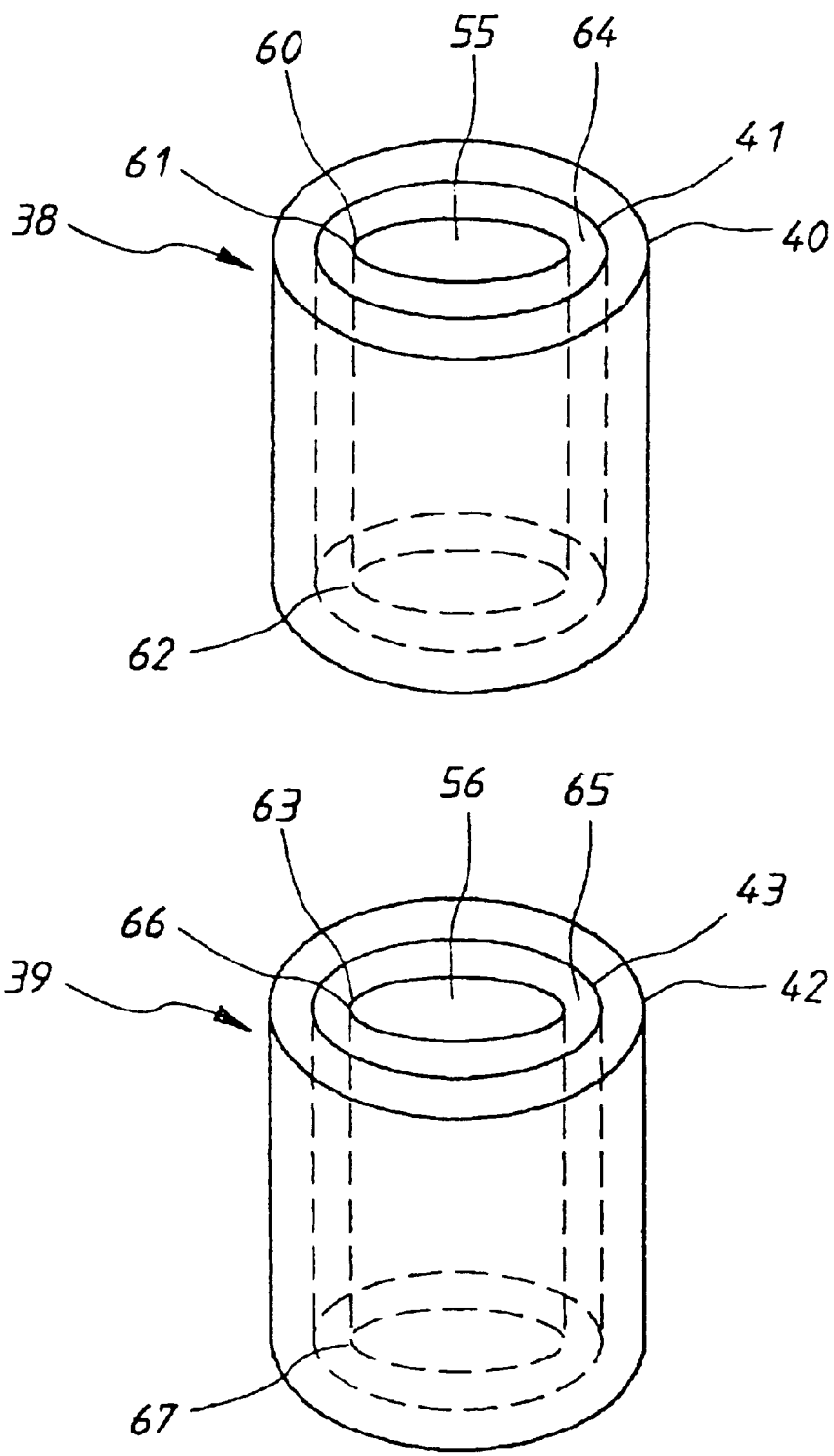
FIG. 5 is a schematic perspective view of another embodiment of the transformer of FIG. 4.

Referring to FIG. 5, there is illustrated an alternative embodiment of the transformer of FIG. 4 where winding 38 includes a third winding 60 which is substantially concentrically nested within winding 41. Winding 39 also includes a third winding 63 substantially concentrically nested within winding 43. Windings 60 and 63 are formed from superconducting tape into a circular cross-sectioned solenoid and respectively include ends 61 and 62, and 66 and 67 which are configured for electrical connection to at least one of the other ends, source 13, load 14, or other passive or active electrical components.

The transformer further includes a third gap 64 which defines the radial separation of windings 41 and 60 and a fourth gap 65 which defines the radial separation of windings 43 and 63. In this embodiment, core gaps 55 and 56 respectively define the inner diameter of windings 60 and 63.

The ampere turns of windings 60 and 63 are substantially the same as the ampere turns of windings 40 and 42, and windings 41 and 43 respectively.

The constituent windings of winding 38 are electrically connected in series and subsequently connected across source 13. That is, ends 46 and 60 are electrically connected by superconducting tape, ends 45 and 47 are electrically connected by superconducting tape, and ends 44 and 61 are respectively connected across source 13. Similarly, in winding 39, windings 42, 43 and 63 are electrically connected in series by superconducting tape and are electrically connected across load 14. That is, ends 50 and 66 are electrically connected by superconducting tape, ends 49 and 51 are electrically connected by superconducting tape, and ends 48 and 67 are respectively connected across load 14.

In other embodiments, ends 44 and 45, 46 and 47, and 60 and 61 are respectively electrically connected across source 13. Ends 48 and 49, 50 and 51, and 66 and 67 are respectively electrically connected across load 14.

The ampere turns of windings 40 and 42 are substantially the same as the ampere turns of windings 41 and 43, and windings 60 and 63.

Gaps 53, 54, 64 and 65, as well as core gaps 55 and 56, are filled with air. In other embodiments, however, these gaps are occupied by air and a material occupies the volume of core gaps 55 and 56. In yet other embodiments, all of the gaps and the core gaps are filled with the material.

The transformer includes a pair of opposed and coplanar closed loops 80 and 81 formed from the material and sharing a common portion 82 which is configured to occupy a substantial volume of the predetermined core gaps. The material is iron, however, in other embodiments the material is ferrite.

In yet further embodiments of the invention, the volume corresponding to core gaps 55 and 56 is used as a conduit to transport cryogen, in the form of liquid nitrogen, to cool the windings from the inside out. Alternatively, liquid neon or helium, or the like may be used as the cryogen.

In some embodiments, not illustrated, the volume occupied by the predetermined core gaps is filled with air and the transformer is disposable within a hollow and substantially toroidal cooling chamber whose open centre portion is configured for receiving common portion 82 of loops 80 and 81 so that the material occupies at least part of the volume of core gaps 55 and 56. Further, the hollow portion is configured to receive not only the transformer, but also to receive cryogen in the form of liquid nitrogen.

The superconducting tape which forms windings 1, 2, 3, 4, 40, 41, 42, 43, and 60 and 63 is of the powder-in-tube type and includes a plurality of longitudinally extending filaments of superconducting material embedded in a metal or metal alloy based matrix. The tape is twisted about its longitudinal axis to provide an anisotropic response to externally applied or self generated magnetic fields. The metal is silver and the metal alloy is silver alloy. In other embodiments, however, the metal is gold and the metal alloy is gold alloy.

The thickness of each filament is less than 40 microns and the overall tape thickness ranges from 0.10 mm to 1.20 mm. In other embodiments, however, the overall tape thickness is 0.20 mm to 1.20 mm and the tape width is 1.8 mm to 20 mm. The superconducting material employed in the superconducting tape is BSCCO-2223.

In some embodiments, it is necessary to place a number of superconducting tapes in a given winding in parallel. In particular, secondary windings 2, 4, 20, 42, 43, or 63, include a plurality of tapes in parallel when, for example, the primary winding can only be driven by 40A and the secondary winding is required to conduct 120A. In such an example, three tapes need be put in parallel to provide the necessary current carrying capacity. However, in this arrangement, at every third of the length of the secondary winding the three tapes need be transposed every third of the total length. In another example, should 200A be required in the secondary winding and the primary can only be driven by 40A, then five tapes would need to be placed in parallel in the secondary winding and each tape transposed every fifth of the total length of the winding. The individual tapes are electrically insulated from each other. The combination of individual tape insulation and transpositioning significantly reduces eddy current loss. The transpositioning forces the current to split evenly between the five tapes, which would otherwise result in the non-uniform distribution of current amongst the tapes and severely overload one or two tapes at the expense of the other three.

It has been found that by providing a plurality of nested windings, each turn of the conductor within each winding is arranged closer to each compensating turn of the other winding. To a first approximation where the primary winding includes a pair of concentrically nested axially extending windings and a secondary winding includes a pair of axially extending concentrically nested windings, the field impinging on all conductors within the windings will be halved. By reducing the magnetic field impinging on all of the windings by half, the eddy and coupling current components of the AC losses will be significantly reduce by a factor of 4. Additionally, and depending on the absolute magnitude of the magnetic field, the hysteresis losses can be reduced by up to a factor of eight.

As described herein, the technique is not limited to including only a pair of concentrically nested axially extending windings in each of the primary and secondary windings. Indeed, higher levels of interleaving can be used up to an amount N/2, where N is the total number of turns in a winding. Employing this technique, provides for each turn to be placed as close together as possible, next to its partner turn in the other winding and the field cancellation will be improved accordingly. However, because of the need to insulate the windings, the number of windings included in each of the primary and secondary windings is limited to approximately three windings each. In arrangements such as those illustrated in FIGS. 2, 3 and 5, the magnetic field impinging on the windings will be reduced by a quarter and thereby reduce the AC losses in the windings by up to a factor of 10.

In general, for the primary and secondary winding each including a pair of windings, the impedance of the transformer will be reduced by approximately half. For the case where each of the primary and secondary windings each include three concentrically nested windings, the transformer will provide one third of the impedance. Similarly for four windings in each of the primary and secondary windings, the impedance will be reduced by a factor of four.

It has been found that by reducing the AC losses in the windings provides substantial savings in the necessary cooling power. For example, in a 100 kW three phase transformer operating at a 60% average load with an efficiency of 99%, AC losses will be split equally between iron loss and winding losses. By employing primary and secondary windings, each including three substantially concentrically nested axially extending windings, the AC losses are reduced from approximately 20 W to 2 W which, if cooled by liquid nitrogen, represents a reduction in its consumption from approximately 8.66 kilograms per day to approximately 0.86 kilograms per day. This corresponds to approximately 10 litres of liquid nitrogen per day in an open system. Assuming there exists a cryogenic penalty factor of 15 for liquid nitrogen from 77K to 300K, the power savings in a cooling plant size would be of the order of 270 watts. As the transformer increases in size, the power savings also increase approximately linearly. For example, a 1 MVA transformer would provide a saving of approximately 100 litres per day of liquid nitrogen and the cooling plant size required would be reduced by 2.7 kilowatts.

In addition to those losses which are prevalent in superconductors described earlier, energy loss from current leads and heat leakage from external surroundings will also affect the cooling plant consumption. Assuming that a transformer includes a current lead leak of 0.045 $WA^{-1}$ per lead, where four leads are required, and a cryostat includes a heat leak of 5 W, then the 100 kVA transformer described above would have 23 W of heat leak and approximately 20 watts of winding losses. This represents a total loss of 43 watts into the liquid nitrogen, which represents a requirement of approximately 645 watts of cooling power at room temperature. By reducing the AC losses in the windings to just 2 watts and employing three nested windings in the primary and secondary windings, the total cooling power required is reduced to just 375 watts, which represents approximately a 60% saving in total cooling energy.

If the present invention were applied to a conventional transformer having normally conductive windings such as copper, the maximum savings in AC losses would equate to approximately 10%. This figure represents a portion of AC losses in these transformers that actually occur as a result of the stray field impinging on the non-superconducting conductors and is characterised entirely as eddy current loss. In these conventional transformers, joule heating in the winding contributes to more than 90% of the total winding losses. Therefore, although it would be practical to apply the present technique to conventional transformers, the advantage achieved is minimal when the cost of implementation is considered. In certain high frequency applications, such as 400 Hz transformers used in military applications for radar power supplies, the reduction in copper eddy current losses, which increase with the square of the frequency, may justify the division of the windings into multiple sets as is described here.

Figure 8:
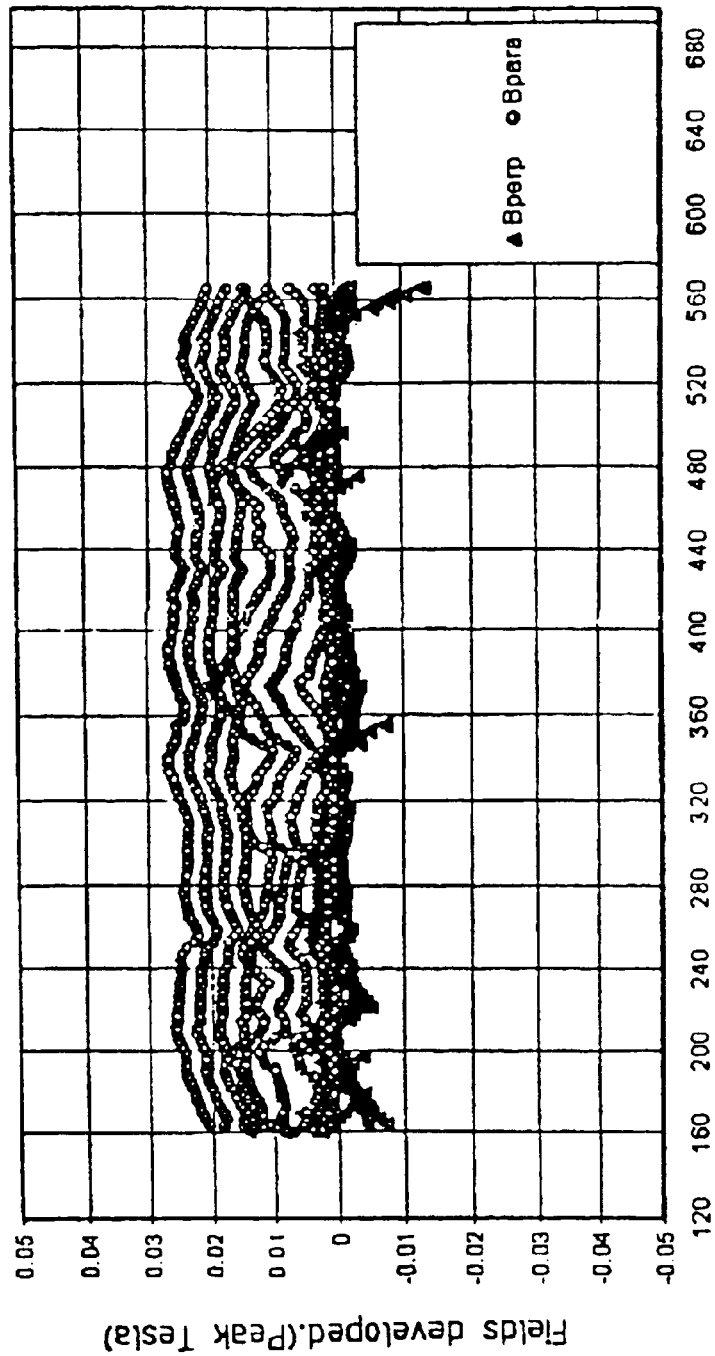
FIG. 8 and FIG. 9 are respective plots of the magnetic field for a winding according to the invention and a prior art winding.
Figure 9:
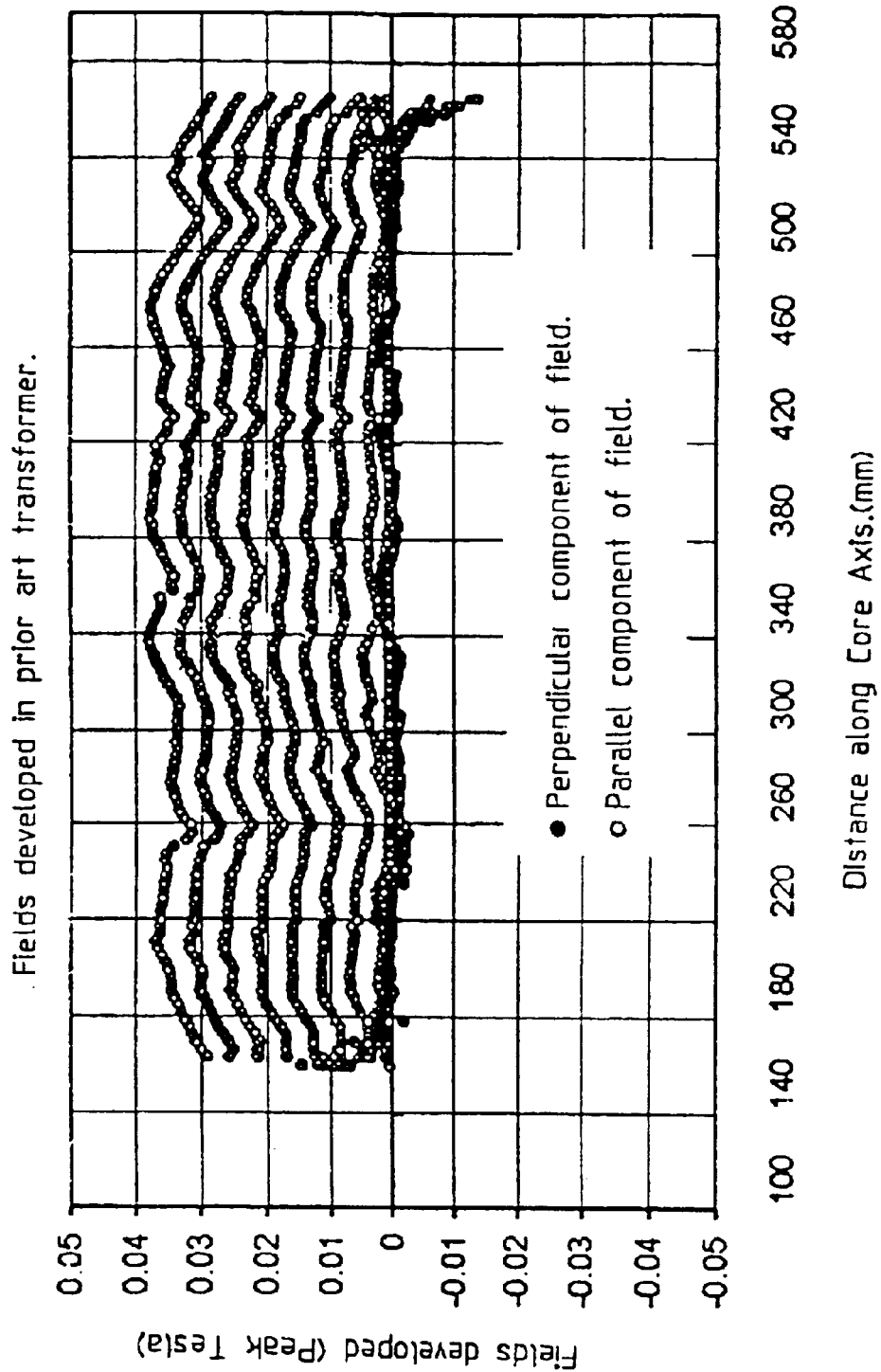

Some graphical results of a particular example of a 100 kVA transformer whose windings are formed from BSCCO-2223 high temperature superconducting tape are shown in FIG. 7. There is provided the results of a magnetic field impinging on the superconducting windings of a transformer according to the embodiment of the invention illustrated in FIG. 1 as a function of the axial position of the windings. The upper data corresponds to a superconducting transformer having only one pair of axially extending windings which are formed from superconducting tape and concentrically nested inside each other. The lower curve corresponds to the embodiment illustrated in FIG. 1. A reduction in the magnetic field impinging on the superconducting windings of the present invention of approximately 50% is observed. As would be expected, this reduction continues to increase as the number of pairs of windings are increased. FIGS. 8 and 9 respectively provide additional indicative measurements of the magnetic field for the preferred embodiment and the prior art.

The AC losses in the windings are calculated to be approximately 63 watts at 300K and 4.2 watts at 77K, compared with 110 watts for a conventional superconducting transformer and 7.3 watts at 77K. This reduction in AC loss in the windings it may be estimated that the advantage gained with the primary and secondary windings each including three axially extending substantially concentrically nested coils provides a reduction in AC losses from 110 watts in the conventional transformer to 30 W.

It will be appreciated by those skilled in the art that any superconducting tape or wire may be employed in windings of a superconducting transformer. Examples of such wires and tapes are disclosed in the PCT patent applications having the publication numbers WO99/48115, WO99/48116, WO99/48117 and WO99/48159 and are herein incorporated by way of cross reference.

Although the invention has been described with reference to specific embodiments and examples, it will be appreciated by those skilled in the art that the invention may be embodied in many other forms.

What is claimed is:

1. A superconducting transformer including at least two pairs of concentrically nested and axially extending windings, each winding having a plurality of turns formed from superconducting tape wherein one winding in each pair is configured for electrical connection to an alternating power source and the other winding in each pair is configured for connection to a load, such that the ampere-turns of a given pair of windings is substantially the same as the number of ampere-turns of any other pair.

2. A transformer according to claim 1 wherein one of the pairs is concentrically nested within the other pair.

3. A transformer according to claim 1 wherein the pairs are concentric and axially offset.

4. A transformer according to claim 1 wherein the windings are tubular.

5. A transformer according to claim 4 wherein the windings are substantially cylindrical.

6. A transformer according to claim 1 wherein the pairs are nested within each other, the alternate windings are connected in series and respectively configured for electrical connection across the power source and the load.

7. A transformer according to claim 1 wherein the alternate windings are each respectively electrically connected in parallel and configured for electrical connection to the power source and load.

8. A transformer according to claim 1 wherein the alternate windings of concentrically nested pairs of windings are each connected such that the magnetic field caused by each winding in the common volume enclosed by the windings is substantially in the same direction.

9. A transformer according to claim 1 wherein the transformer includes two pairs of axially extending windings in which the first pair includes a first axially extending primary winding corresponding to the outermost winding and a first axially extending secondary winding nested within the first primary winding and the second pair includes a second axially extending primary winding nested within the first secondary winding and a second axially extending secondary winding nested within the second primary winding and corresponding to the innermost winding, the transformer including three predetermined gaps defining the radial separation of the nested windings and a predetermined core gap defining the diameter of the second secondary winding, wherein the first primary winding and first secondary winding include substantially the same number of ampere-turns as the second primary winding and the second secondary winding.

10. A transformer according to claim 9 and further including:
   a third pair of axially extending windings substantially concentrically nested within the second secondary winding in which the third pair of windings includes a third axially extending primary winding and a third axially extending secondary winding concentrically nested within the third primary winding; and
   a fourth and fifth predetermined gap respectively defining the radial separation of the second secondary winding and the third primary winding and the radial separation of the third primary winding and third secondary winding and the predetermined core gap defines the inner diameter of the third secondary winding, wherein the third primary winding and third secondary winding include substantially the same number of ampere-turns as the first primary winding and the first secondary winding and the second primary winding and the second secondary winding.

11. A transformer according to claim 10 wherein the five predetermined air gaps and the core gap are filled with air.

12. A transformer according to claim 10 wherein all of the predetermined gaps and the predetermined core gap are filled with the material.

13. A transformer according to claim 10 wherein the volume of the five predetermined gaps are occupied by air and a material, for concentrating the magnetic field, occupies the volume of the predetermined core gap.

14. A transformer according to claim 13 wherein the material forms a pair of opposed and coplanar closed loops which share a common portion for occupying a substantial volume of the predetermined core gap.

15. A transformer according to claim 13 wherein the volume corresponding to the predetermined core gap is used as a conduit to transport cryogen.

16. A transformer according to claim 13 wherein the material has a high relative magnetic permeability with a low magnetic remanence and high saturation point.

17. A transformer according to claim 16 wherein the permeability is greater than 1000 and the material is a magnetically soft ferrite.

18. A superconducting transformer including:
   a first primary winding for electrically connecting with an alternating power source, the first winding extending along a first axis and having a first plurality of turns of superconducting tape;
   a second primary winding for electrically connecting with the source, the second winding extending along a second axis and having a second plurality of turns of superconducting tape;

a first secondary winding extending along the first axis for electrically connecting with a load, the first secondary winding being magnetically coupled to the first primary winding and having a third plurality of turns of superconducting tape; and a second secondary winding extending along the second axis for electrically connecting with the load, the second secondary winding being magnetically coupled to the second primary winding and having a fourth plurality of turns of superconducting tape.

19. A transformer according to claim 18 wherein one of the primary windings is concentrically nested within the other primary winding and one of the secondary windings is concentrically nested within the other secondary winding.

20. A transformer according to claim 18 wherein one of the primary windings is concentrically nested within one of the secondary windings and the other primary winding is concentrically nested within the other secondary winding.

21. A transformer according to claim 18 wherein the primary windings are electrically connected together in series to the source and the secondary windings are electrically connected together in series to the load.

22. A transformer according to claim 18 wherein the primary windings are electrically connected together in parallel to the source and the secondary winding are electrical connected together in parallel to the load.

23. A transformer according to claim 18 wherein both the secondary windings are magnetically coupled to both the primary windings.

24. A transformer according to claim 18 wherein the primary windings are substantially axially coextensive and radially nested.

25. A transformer according to claim 18 wherein the secondary windings are substantially axially coextensive and radially nested.

26. A transformer according to claim 18 wherein the primary windings and the secondary winding are all substantially axially coextensive and radially nested wherein the primary windings and the secondary windings are radially alternated.

27. A transformer according to claim 18 wherein radially adjacent windings define between them respective winding gaps and the or each radially innermost winding defines a corresponding core gap.

28. A transformer according to claim 27 wherein the winding gaps are substantially air.

29. A transformer according to claim 27 wherein the winding gaps are substantially occupied with a high magnetically permeable material.

30. A transformer according to claim 27 wherein the core gap or gaps are substantially occupied with a high magnetically permeable material.

31. A transformer according to claim 18 and further including:

a third primary winding for electrically connecting to the source and having a fifth plurality of turns of superconducting tape, the third winding being concentrically nested within the second primary winding; and a third secondary winding for electrically connecting to the load and having a sixth plurality of turns of superconducting tape, the third secondary winding being concentrically nested within the second secondary winding wherein the ratio of the fifth plurality of turns to the sixth plurality of turns is equal to the ratio of the first plurality of turns to the second plurality of turns.

32. A transformer according to claim 31 wherein the material forms a pair of parallel and opposed closed loops which share a common portion for occupying substantially all of the core gaps.

33. A transformer according to claim 31 wherein the material has a low magnetic remanence and high saturation point.

34. A transformer according to claim 31 wherein a cryogen is received in the or all the core gaps between the material and the innermost winding.

35. A transformer according to claim 18 wherein the first primary and secondary windings are interleaved with each other.

36. A transformer according to claim 18 wherein the second primary and secondary windings are interleaved with each other.

37. A transformer according to claim 18 wherein the first and second primary windings are interleaved and the first and second secondary windings are interleaved.

38. A transformer according to claim 18 wherein the superconducting tape is twisted about its longitudinal axis to provide an anisotropic response to externally applied or self-generated magnetic fields.

39. A transformer according to claim 38 wherein the superconductor tape operates in the temperature range between 63K and 77K.

40. A transformer according to claim 38 wherein the superconducting tape operates in the temperature range between 1K and 110K.

41. A transformer according to claim 18 wherein the ratio of the first plurality of turns to the third plurality of turns is equal to the ratio of the second plurality of turns to the fourth plurality of turns.

42. A transformer according to claim 41 wherein the first plurality of turns is equal to the second plurality of turns and the third plurality of turns is equal to the fourth plurality of turns.

43. A transformer according to claim 18 wherein the first and the second axes are coaxial.

44. A transformer according to claim 43 wherein the first and the second axes are linear.

45. A method for producing a superconducting transformer including:

forming at least two pairs of axially extending windings having a plurality of turns formed from a superconducting tape;

concentrically nesting the windings within each other;

electrically connecting alternate windings in series;

electrically connecting alternate windings, starting from the outermost winding, to an alternating current source, and electrically connecting the other alternate windings to a load; and configuring the ampere-turns of sequential pairs of windings to be substantially the same as the ampere-turns of any other sequential pair of windings.

46. A method according to claim 45 including the step of connecting the alternate windings magnetically in series.

47. A method of producing a superconducting transformer including:

forming at least two pairs of axially extending windings each having a plurality of turns formed from a superconducting tape;

concentrically nesting the windings within each other;

electrically connecting alternate windings, starting from the outermost winding, in parallel across an alternating current source, and electrically connecting the other alternate windings in parallel across a load; and configuring the ampere-turns of sequential pairs of windings to be substantially the same as the ampere-turns of any other sequential pair of windings.

48. A method of constructing a superconducting a transformer including the steps of:

providing at least two pairs of concentrically nested and axially extending windings, each winding having a plurality of turns formed from superconducting tape;

configuring one winding in each pair for electrical connection to an alternating power source; and configuring the other winding in each pair for connection to a load such that the ampere-turns of a given pair of windings is substantially the same as the number of ampere-turns of any other pair.

49. A superconducting transformer including:

a primary winding;

a secondary winding;

a plurality of primary sub-windings resulting from a division of the primary winding, each of the primary sub-windings having a plurality of turns formed from a superconducting tape;

a plurality of secondary sub-windings resulting from a division of the secondary winding, each of the secondary sub-windings having a plurality of turns formed from a superconducting tape, wherein the primary sub-windings are concentrically interleaved with the secondary sub-windings; and, a core gap defined by the innermost sub-winding, the core gap substantially occupied by iron.

50. A superconducting transformer according to claim 49 wherein: the superconducting tape is twisted about its longitudinal axis to provide an anisotropic response to externally applied or self-generated magnetic fields.

51. A superconducting transformer including:

a primary winding;

a secondary winding;

a plurality of primary sub-windings resulting from a division of the primary winding, each of the primary sub-windings having a plurality of turns formed from a superconducting tape;

a plurality of secondary sub-windings resulting from a division of the secondary winding, each of the secondary sub-windings having a plurality of turns formed from a superconducting tape, wherein the primary sub-windings are concentrically interleaved with the secondary sub-windings, and wherein the superconducting tape is twisted about its longitudinal axis to provide an anisotropic response to externally applied or self-generated magnetic fields.

52. A superconducting transformer including:

a primary winding;

a secondary winding;

a plurality of primary sub-windings resulting from a division of the primary winding, each of the primary sub-windings having a plurality of turns formed from a superconducting tape;

a plurality of secondary sub-windings resulting from a division of the secondary winding, each of the secondary sub-windings having a plurality of turns formed from a superconducting tape, and wherein the primary sub-windings are disposed coaxially with and longitudinally spaced apart from the secondary sub-windings.

53. A superconducting transformer including:

a primary winding;

a secondary winding;

a plurality of primary sub-windings resulting from a division of the primary winding, each of the primary sub-windings having a plurality of turn formed from a superconducting tape;

a plurality of secondary sub-windings resulting from a division of the secondary winding, each of the secondary sub-windings having a plurality of turns formed from a superconducting tape, wherein a partial set of the plurality of turns within each of the respective secondary sub-windings is connected in parallel, each of the partial sets being transposed at one or more distances along the length its respective secondary sub-winding, and wherein the primary sub-windings are concentrically interleaved with the secondary sub-windings.

54. A superconducting transformer according to claim 53 wherein:

each of the partial sets is transposed at all of the distances, along the length its respective secondary sub-winding, that are approximately equal to the length of their respective sub-winding divided by the number of turns in the partial set.

* * * * *